(12) United States Patent
Ukita et al.

(10) Patent No.: US 8,439,291 B2
(45) Date of Patent: May 14, 2013

(54) WEBBING WINDING DEVICE

(75) Inventors: Masaru Ukita, Aichi-ken (JP); Wataru Yanagawa, Aichi-ken (JP); Yoshiaki Maekubo, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 249 days.

(21) Appl. No.: 13/004,299

(22) Filed: Jan. 11, 2011

(65) Prior Publication Data

US 2011/0174910 A1   Jul. 21, 2011

(30) Foreign Application Priority Data

Jan. 15, 2010 (JP) .................................. 2010-007124
Jun. 2, 2010 (JP) .................................. 2010-127082
Nov. 11, 2010 (JP) .................................. 2010-253117

(51) Int. Cl.
*B65H 75/48* (2006.01)
(52) U.S. Cl.
USPC ...................... 242/379.1; 242/375; 242/375.1
(58) Field of Classification Search .................. 242/375, 242/375.1, 379.1
See application file for complete search history.

(56) References Cited

U.S. PATENT DOCUMENTS

| | | | | |
|---|---|---|---|---|
| 5,738,293 A | * | 4/1998 | Fohl | 242/374 |
| 6,390,403 B2 | * | 5/2002 | Specht | 242/374 |
| 6,676,059 B1 | * | 1/2004 | Bell et al. | 242/379.1 |
| 8,240,591 B2 | * | 8/2012 | Aihara et al. | 242/374 |
| 2007/0002047 A1 | | 1/2007 | Desgranges et al. | |
| 2008/0087754 A1 | | 4/2008 | Aihara et al. | |
| 2008/0203210 A1 | | 8/2008 | Nagata et al. | |

FOREIGN PATENT DOCUMENTS

| | | |
|---|---|---|
| JP | 2005001648 A | 1/2005 |
| JP | 2007084042 A | 4/2007 |
| JP | 2009184520 A | 8/2009 |
| JP | 2009214693 A | 9/2009 |

* cited by examiner

*Primary Examiner* — Sang Kim
(74) *Attorney, Agent, or Firm* — Roberts Mlotkowski Safran & Cole P.C.

(57) ABSTRACT

It is provided a webbing winding device with good assembly characteristics of components in a second lock unit. In the webbing winding device, due to a leading end of a spring tab of a guide plate interacting with ratchet teeth of an internal ratchet and a second lock base rotating in the pull-out direction in this state, relative rotation occurs between the guide plate and the second lock base, and a second lock pawl is meshed with the ratchet teeth of the internal ratchet. Since this configuration is not a configuration in which relative rotation between the guide plate and a second lock base is induced by bias force of bias means, such as a compression coil spring or the like, there is no bias force received in the rotational circumferential direction when the guide plate and the second lock base are being assembled, resulting in easy assembly.

3 Claims, 6 Drawing Sheets

F I G. 1
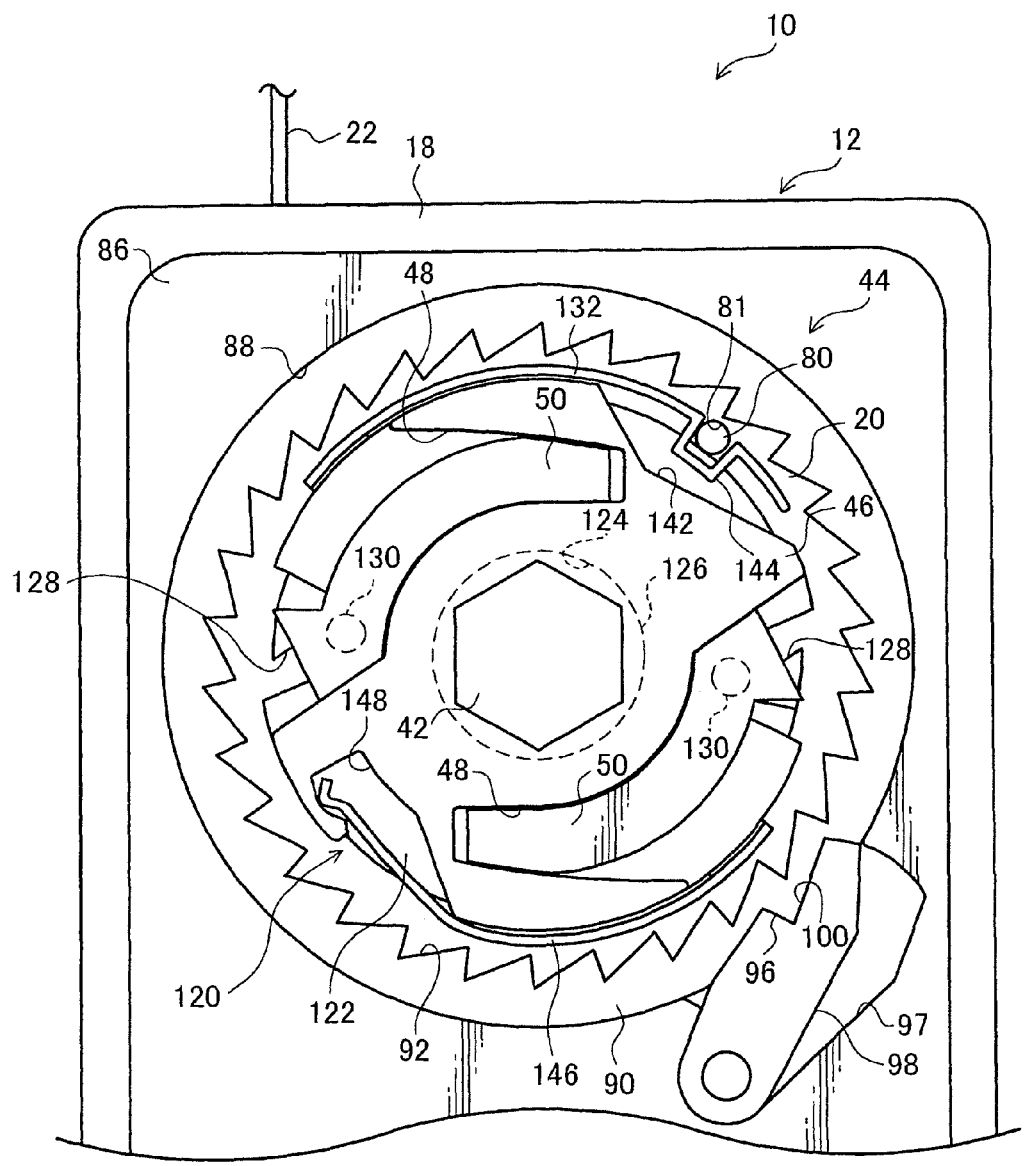

WEBBING WINDING DEVICE

CROSS-REFERENCE TO RELATED APPLICATION

This application claims priority under 35 USC 119 from Japanese Patent Application No. 2010-007124 filed on Jan. 15, 2010, No. 2010-127082 filed on Jun. 2, 2010 and No. 2010-253117 filed on Nov. 11, 2010, the disclosures of which are incorporated by reference herein.

BACKGROUND OF THE INVENTION

1. Field of the Invention

The present invention relates to a webbing winding device for housing a webbing belt for restraining the body of a vehicle occupant by winding the webbing belt on a spool, and in particular to a webbing winding device capable of switching the magnitude of load for absorption in a force limiter mechanism.

2. Related Art

In a webbing winding device described in Japanese Patent Application Laid-Open (JP-A) No. 2007-84042, a first lock mechanism actuates, and an axial direction end side of a torsion shaft coupled to a spool at a length direction intermediate portion is retained by the first lock mechanism, and furthermore, in this state, a second lock mechanism actuates and the axial direction other end side of the torsion shaft is retained by the second lock mechanism. In this state, twisting is generated in the torsion shaft when force to rotate the spool in the pull-out direction exceeds the mechanical strength of the torsion shaft on both sides of the coupling portion to the spool. The spool can rotate in the pull-out direction by the amount of twisting generated in the torsion shaft, and a portion of the force to rotate the spool in the pull-out direction, namely a portion of the tension force on the webbing belt, is absorbed with the twisting deformation of the torsion shaft.

However, if prior to operating the second lock mechanism, engagement of a ring lock pawl configuring the second lock mechanism and a lock ring, configuring the second lock mechanism along with the ring lock pawn, is released, then the second lock mechanism substantially ceases to function. Consequently, in this state, twisting can be induced in the torsion shaft by force to rotate the spool in the pull-out direction exceeding the mechanical strength of the torsion shaft at one end side of the coupling portion.

Accordingly, the configuration described in JP-A No. 2007-84042 can change the magnitude of the so-called force limiter load.

However, in the second lock mechanism of a webbing winding device configured in this manner, when interaction of a wire with a rotation circular plate portion is released, the rotation circular plate portion is pressed by bias force of a compression coil spring provided to a second lock base, and the rotation circular plate rotates relatively with respect to the second lock base. The second lock pawl thereby meshes with internal ratchet teeth of the lock ring, and the second lock mechanism adopts an actuated state.

Due to the above configuration, when assembling the second lock mechanism, the rotation circular plate and the second lock base are assembled in a state in which bias force of the compressed coil spring is being resisted, and the wire also needs to interact with the plate portion of the rotation circular plate, with this resulting in poor manufacturability during assembly.

SUMMARY OF THE INVENTION

The present invention is made in consideration of the above circumstances, and provides a webbing winding device with good assembly characteristics for components in a second lock unit.

A webbing winding device of a first aspect of the present invention includes a cylindrical shaped spool having a length direction base end side of a long strip-shaped webbing belt anchored to the spool, the webbing belt being wound from the base end side by rotation of the spool in a winding direction; an energy absorbing unit including a first energy absorption section connected to the spool at an axial direction intermediate portion inside the spool, such that a spool-side coupling portion is not rotatable relative to the spool, the first energy absorption section absorbing energy on a side further towards a first axial direction end of the spool than the spool-side coupling portion deforming plastically with respect to the spool-side coupling portion, and a second energy absorption section absorbing energy on a side further towards a second axial direction end of the spool than the spool-side coupling portion deforming plastically with respect to the spool-side coupling portion; a first lock unit provided at the first axial direction end of the spool, when actuated the first lock unit retaining the first energy absorption section at the opposite side to the spool-side coupling portion and restricting rotation of the first energy absorption section in a pull-out direction that is opposite to the winding direction; and a second lock unit provided at the second axial direction end of the spool, when actuated the second lock unit retaining the second energy absorption section at the opposite side to the spool-side coupling portion and restricting rotation of the second energy absorption section in the pull-out direction that is opposite to the winding direction, the second lock unit including: a base member connected at the second axial direction end of the spool to the second energy absorption section so as not to be relatively rotatable with respect to the second energy absorption section; a lock member relatively displaceable towards an engagement direction that is outward in a rotation radial direction of the spool with respect to the base member; a restriction unit provided at the rotation radial direction outside of the base member, the restriction unit including internal ratchet teeth engageable by the lock member when displaced in the engagement direction, and restricting rotation of the base member in the pull-out direction by the lock member engaging the ratchet teeth; a guide unit retaining the lock member in a state separated from the ratchet teeth, and guiding the lock member towards the engagement direction while the base member rotates relative to the guide unit in the pull-out direction; and a relative rotation inducing unit engaged directly or indirectly with the spool, the relative rotation inducing unit causing the guide unit to rotate with the spool when in the engaged state, and restricting rotation of the guide unit in the pull-out direction, and inducing relative rotation of the base member with respect to the guide unit when engagement of the relative rotation inducing unit to the spool is released by actuation of the first lock unit.

According to the webbing winding device of the first aspect of the present invention, in a state in which the webbing belt pulled out from the spool is fitted around the body of an occupant, the first lock unit is actuated when specific conditions arise such as, for example, a vehicle rapid deceleration state occurs, and the webbing belt is pulled out from the spool, rotating the spool in the pull-out direction with an acceleration of a specific amount or greater. When the first lock unit is actuated, the opposite side of the first energy absorption section, configuring the energy absorbing unit, to the spool-side coupling portion is retained by the first lock unit, such that rotation in the pull-out direction of the opposite side of the first energy absorption section to the spool-side coupling portion is restricted.

The energy absorbing unit is connected to the spool at an axial direction intermediate portion inside the spool with the spool-side coupling portion in a state not relatively rotatable with respect to the spool. Accordingly, the first energy absorption section of the energy absorbing unit restricts rotation of the spool in the pull-out direction by being retained by the first lock unit, and therefore restricts pulling out of the webbing belt from the spool.

Then for example, in this state, when an occupant to which the webbing belt is fitted pulls the webbing belt with a force of a fixed amount or greater due to inertia during vehicle rapid deceleration, a rotation force is imparted to the spool of a fixed amount or greater. This rotation force, from the spool through the spool-side coupling portion of the energy absorbing unit, attempts to rotate the first energy absorption section in the pull-out direction.

In this state, rotation in the pull-out direction of the first energy absorption section is restricted by the first lock unit. However, when, as described above, rotation force in the pull-out direction applied to the spool-side coupling portion exceeds the mechanical strength of the first energy absorption section, plastic deformation occurs in the first energy absorption section. The webbing belt is allowed to be pulled out from the spool by the amount of the plastic deformation of the first energy absorption section, and a portion of the rotation force in the pull-out direction applied to the spool, namely a portion of the tension force on the webbing belt, is absorbed with the deformation of the first energy absorption section.

Furthermore, the second lock unit is provided at the second axial direction end of the spool. A lock member is provided to the base member configuring the second lock unit, and when the second lock unit is actuated and engagement of the relative rotation inducing unit, configuring the second lock unit, to the spool is released, rotation is restricted in the pull-out direction of the guide unit that has up till now rotated with the base member due to the relative rotation inducing unit. Due to the base member in the second energy absorption section of the energy absorbing unit being connected further to the second axial direction second end of the spool than the above spool-side coupling portion so as not to be relatively rotatable with respect to the second energy absorption section, the base member relatively rotates in the pull-out direction with respect to the guide unit when the spool rotates in the pull-out direction in a state in which rotation of the guide unit in the pull-out direction is restricted.

When the base member relatively rotates in the pull-out direction with respect to the guide unit in this manner, the lock member that has been retained up to this point in the guide member is guided by the guide unit and displaces in the engagement direction, engaging with the ratchet teeth of the restriction unit provided at the outside of the base member. Rotation of the base member in the pull-out direction is thereby restricted, and therefore rotation in the pull-out direction of the opposite side of the second energy absorption section to the spool-side coupling portion is also restricted.

Consequently, in this state, unless a rotation force of magnitude exceeding the sum of the mechanical strength of the first energy absorption section and the mechanical strength of the second energy absorption section is imparted to the spool-side coupling portion of the energy absorbing unit, plastic deformation cannot be induced in both the first energy absorption section and the second energy absorption section, and therefore the spool cannot be rotated in the pull-out direction. Accordingly, in the webbing winding device according to the present invention, the magnitude of the energy to be absorbed by the energy absorbing unit can be changed by whether or not the second lock unit is actuated.

However, in the webbing winding device according to the present invention, as described above, by releasing engagement of the relative rotation inducing unit and the spool, and restricting rotation of the guide unit in the pull-out direction, relative rotation to the base member for rotating in the pull-out direction is induced. Consequently, since configuration is made without biasing the guide unit with a spring or the like so as to induce relative rotation with respect to the base member, assembly of the guide unit is made easier.

A webbing winding device according to a second aspect of the present invention is the webbing winding device of the first aspect of the present invention, wherein the guide unit is configured to include a guide member provided to the second energy absorption section at a side of the spool so as to be relatively rotatable with respect to the second energy absorption section, and having a guide portion that engages the lock member, the guide portion guiding the lock member towards the engagement direction by the lock member relatively rotating in the pull-out direction; the relative rotation inducing unit is a relative rotation inducing portion provided to the guide member, the leading end side of the relative rotation inducing portion biasing the restriction unit in the direction to engage with the ratchet teeth, and the relative rotation inducing portion restricting rotation of the guide member in the pull-out direction by the leading end side of the relative rotation inducing portion engaging with the ratchet teeth; and the webbing winding device further includes a trigger unit provided to the spool, retaining the relative rotation inducing portion against bias force of the relative rotation inducing portion in a position separated from the ratchet teeth, and releasing retention of the relative rotation inducing portion to actuate the second lock unit by actuating the first lock unit.

According to the webbing winding device of the second aspect of the present invention, the relative rotation inducing portion configuring the relative rotation inducing unit is provided to the guide member configuring the guide unit. The relative rotation inducing portion is retained by trigger unit provided to the spool, and when the first lock unit is actuated, retention of the relative rotation inducing portion by the trigger unit is released, actuating the second lock unit.

The leading end side of the relative rotation inducing portion, released from retention by the restriction unit, approaches the ratchet teeth of the restriction unit due to its bias force. The relative rotation inducing portion approaches and engages with the ratchet teeth, restricting rotation in the pull-out direction of the guide member on which the relative rotation inducing portion is provided. When the spool is rotated further from this state in the pull-out direction, the base member rotates in the pull-out direction with respect to the guide member, and the lock member engages with the ratchet teeth.

However, in a lock mechanism of a conventional webbing winding device, configuration is made such that when an inertial mass body cannot keep up with rotation following a spool rotating in the winding direction, and relative rotation occurs between the spool and the inertial mass body, a W-pawl provided to the inertial mass body engages with ratchet teeth of a rotation member that is relatively rotatable with respect to the spool, transmitting rotation of the spool to the rotation member. As a consequence, the lock mechanism is actuated, and the lock pawl is engaged with the ratchet teeth of the lock base that is not relatively rotatable with respect to the spool, thereby restricting rotation of the spool. In a lock mechanism configured in this manner, the ratchet for teeth engaging with the W-pawl are separate from the ratchet teeth for engaging with the lock pawl. In contrast thereto, in the webbing winding device according to the present invention, the configuration for restricting rotation of the base member through the lock member and the configuration for engaging with the relative rotation inducing portion and restricting rotation of the guide member in the pull-out direction are both the same ratchet teeth of the restriction unit. Configuration can thereby be simplified.

Further, since rotation of the guide member in the pull-out direction is restricted by the relative rotation inducing portion provided to the guide member engaging with the ratchet teeth of the restriction unit, there is no change in the relative positional relationship between the guide member and the ratchet teeth in the state in which the relative rotation inducing portion is engaged with the ratchet teeth. However, when the base member has rotated in the pull-out direction with respect to the guide member, the movement amount in the engagement direction of the lock member with respect to the base member is fundamentally fixed. Accordingly, by appropriately setting the engagement position of the relative rotation inducing portion to the ratchet teeth, relative rotation of the base member with respect to the guide member can be started at the timing with which the lock member has moved in the engagement direction and the lock member has engaged with the ratchet teeth, without moving past the ratchet teeth.

A webbing winding device of a third aspect of the present invention is the webbing winding device of the second aspect of the present invention, wherein: the guide member is configured by a plate portion formed in a thin plate shape having a thickness direction along the spool axial direction, supported at the side of the base member so as to be rotatable relative to the second energy absorption section and formed with the guide portion; and the relative rotation inducing portion is configured by a spring tab extending from the plate portion and connected to an external peripheral portion of the plate portion, the leading end side of the spring tab being retained by the trigger unit, and the spring tab engaging with the ratchet teeth due to an inherent resilience of the spring tab when retention by the trigger unit is released.

According to the webbing winding device according to the third aspect of the present invention, the plate portion formed in a thin plate shape is rotatably supported by the second energy absorption section at the side of the base member. The spring tab extending out from the plate portion is retained by the trigger unit; however, when retention by the trigger unit is released, due to its resilience, the leading end side of the spring tab approaches and engages with the ratchet teeth of the restriction unit. Rotation of the plate portion in the pull-out direction is thereby restricted, and the lock member, which has displaced in the engagement direction due the rotation in this state of the base member in the pull-out direction and due to the guide member, engages with the ratchet teeth.

In the webbing winding device according to the present invention, since the plate portion configuring the guide unit is supported by the second energy absorption section and is also formed in a thin plate shape, the second lock unit can be suppressed from increasing in size along the spool axial direction. However, the spring tab configuring the relative rotation inducing unit is integrally formed to the plate portion and engages with the ratchet teeth due to its inherent resilience. Accordingly, provision of a separate dedicated bias means becomes unnecessary, and since the spring tab can be formed together with the plate portion, an increase in the number of components can be suppressed.

BRIEF DESCRIPTION OF THE DRAWINGS

Exemplary embodiments of the present invention will be described in detail based on the following figures, wherein:

FIG. 1 is a side view showing a configuration of relevant portions of a webbing winding device according to an exemplary embodiment of the present invention;

DETAILED DESCRIPTION OF THE INVENTION

<Configuration of Exemplary Embodiment>

Figure 6:
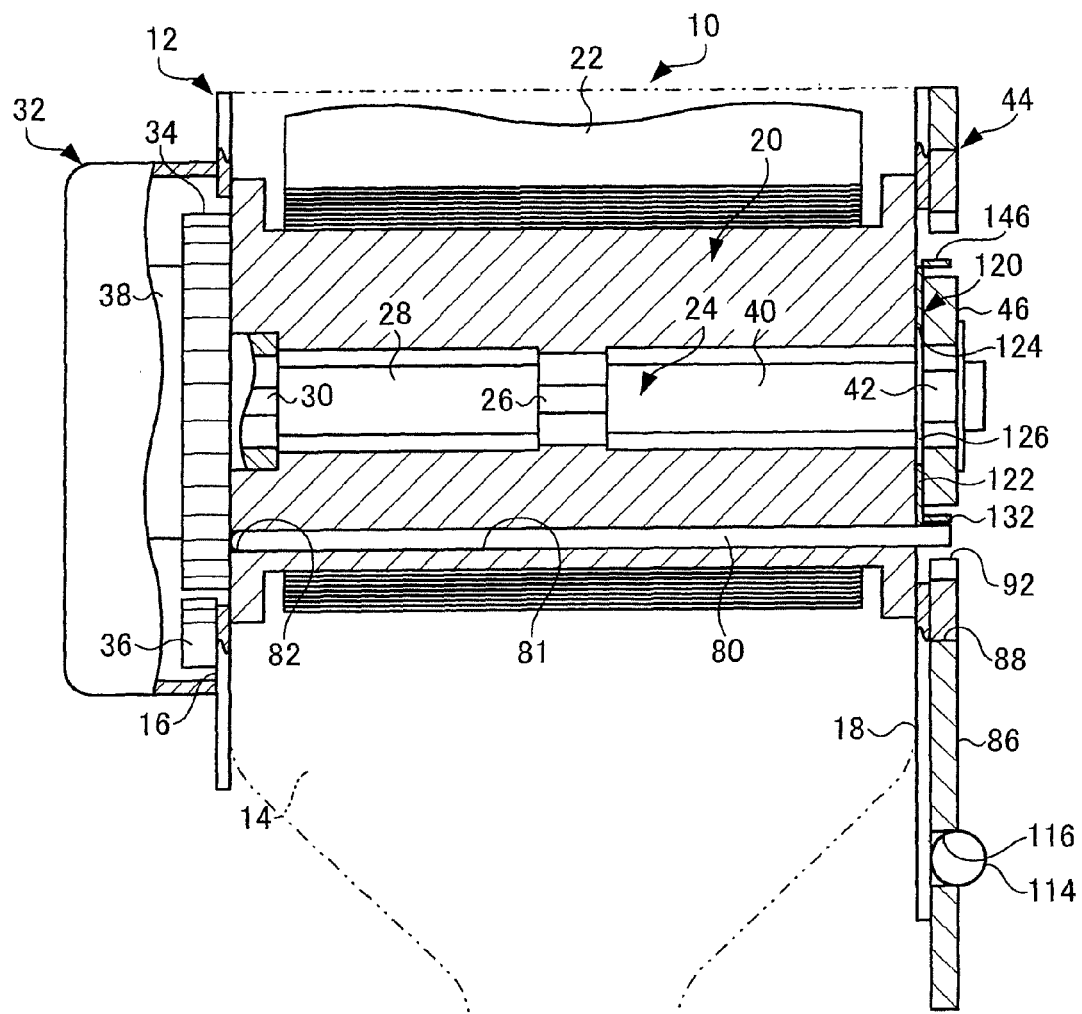
FIG. 6 is a front cross-section schematically showing an overall configuration of a webbing winding device according to an exemplary embodiment of the present invention.

FIG. 6 is a front cross-section schematically showing a configuration of a webbing winding device 10 according to an exemplary embodiment of the present invention.

As shown in FIG. 6, the webbing winding device 10 is provided with a frame 12. The frame 12 is equipped with a plate shaped back plate 14 for fixing to a vehicle body. A leg plate 16 extends from one width direction end portion of the back plate 14 substantially at right angles to the back plate 14. A leg plate 18 extends out from a portion at the other width direction end of the back plate 14 in the same direction as the leg plate 16 extending direction, such that the frame 12 forms substantially a U-shape in plan view.

A spool 20 is disposed between the leg plate 16 and the leg plate 18. The spool 20 has an axial direction along the facing direction of the leg plate 16 and the leg plate 18, and a base end portion of a long strip shaped webbing belt 22 is anchored to an axial direction intermediate portion of the spool 20. The spool 20 accommodates the webbing belt 22 by rotating the spool 20 in a winding direction, which is one direction about the spool 20 axis, thereby winding the webbing belt 22 from its base end side.

The spool 20 is hollow along its central axial line, and a torsion shaft 24, serving as an energy absorbing unit, is housed at the inside of the spool 20. The torsion shaft 24 is equipped with a spool-side coupling section 26. The spool-side coupling section 26 is positioned between the two axial direction ends of the spool 20, and the torsion shaft 24 is integrally coupled relative to the spool 20 using the spool-side coupling section 26.

A bar shaped first energy absorbing portion 28 is formed contiguously from the end face of the spool-side coupling section 26 on the leg plate 16 side. A first link portion 30 is formed to the leading end side of the first energy absorbing portion 28, integrally and coaxially formed relative to the first energy absorbing portion 28. The first link portion 30 is integrally coaxially coupled to a first lock base 34 configuring a first lock mechanism 32, serving as a first lock unit.

The first lock base 34 is insertion fitted into the spool 20, from the end of the spool 20 on the leg plate 16 side, so as to be coaxial and relatively rotatable with respect to the spool 20. However, as described above, fundamentally the first lock base 34 is coaxially and integrally coupled with respect to the spool 20 by the first link portion 30 being integrally coupled with respect to the first lock base 34.

A first lock pawl 36 is provided at the radial direction outside of the first lock base 34. The first lock pawl 36 is axially supported on the leg plate 16 so as to be capable of swinging. Configuration is made such that when the first lock pawl 36 swings in a specific direction, ratchet teeth formed to the first lock pawl 36 approach an external peripheral portion of the first lock base 34, and can mesh with ratchet teeth formed to external peripheral portion of the first lock base 34.

A rotation member 38 is provided on the opposite side of the first lock base 34 to the spool 20, with the first lock base 34 disposed between the rotation member 38 and the spool 20. The rotation member 38 is provided coaxially and relatively rotatable to the first lock base 34. Configuration is made such that the rotation member 38 performs following rotation with respect to the first lock base 34, due to bias force from bias means, not shown in the drawings, such as, for example, a compression coil spring, torsion coil spring or the like.

While details are omitted in the drawings, the first lock mechanism 32 is equipped with a first lock member that restricts rotation of the rotation member 38. The first lock member is actuated and restricts rotation of the rotation member 38 under inertia during rapid deceleration of a vehicle and when the first lock base 34 is abruptly rotated in a pull-out direction, which is the opposite direction to the above winding direction. Coupled to relative rotation between the first lock base 34 and the rotation member 38 arising from the first lock base 34 attempting to rotate in the pull-out direction in a state in which rotation of the rotation member 38 is restricted, the first lock pawl 36 moves so as to approach the external peripheral portion of the first lock base 34.

A bar shaped second energy absorbing portion 40 is formed contiguously from the end face of the spool-side coupling section 26 on the leg plate 18 side. A second link portion 42 is integrally formed coaxial with respect to the second energy absorbing portion 40 at the leading end side of the second energy absorbing portion 40. A second lock base 46, serving as a base member configuring a second lock mechanism 44 that serves as a second lock unit, is insertion fitted into by the second link portion 42 such that the second lock base 46 is in a non-rotatable state with respect to the second link portion 42.

As shown in FIG. 1, the second lock base 46 is insertion fitted over an end portion of the spool 20 on the leg plate 18 side, so as to be coaxial and relatively rotatable with respect to the spool 20. However, as described above, the second lock base 46 is basically coaxially and integrally coupled with respect to the spool 20 by the second link portion 42 being integrally coupled to the second lock base 46. A pair of pawl housing portions 48 are formed in the second lock base 46. Each of the pawl housing portions 48 is open to one portion at the outer periphery of the second lock base 46, and open to the end face of the second lock base 46 at the opposite side to the spool 20. Second lock pawls 50 are housed in the pawl housing portions 48.

Figure 2:
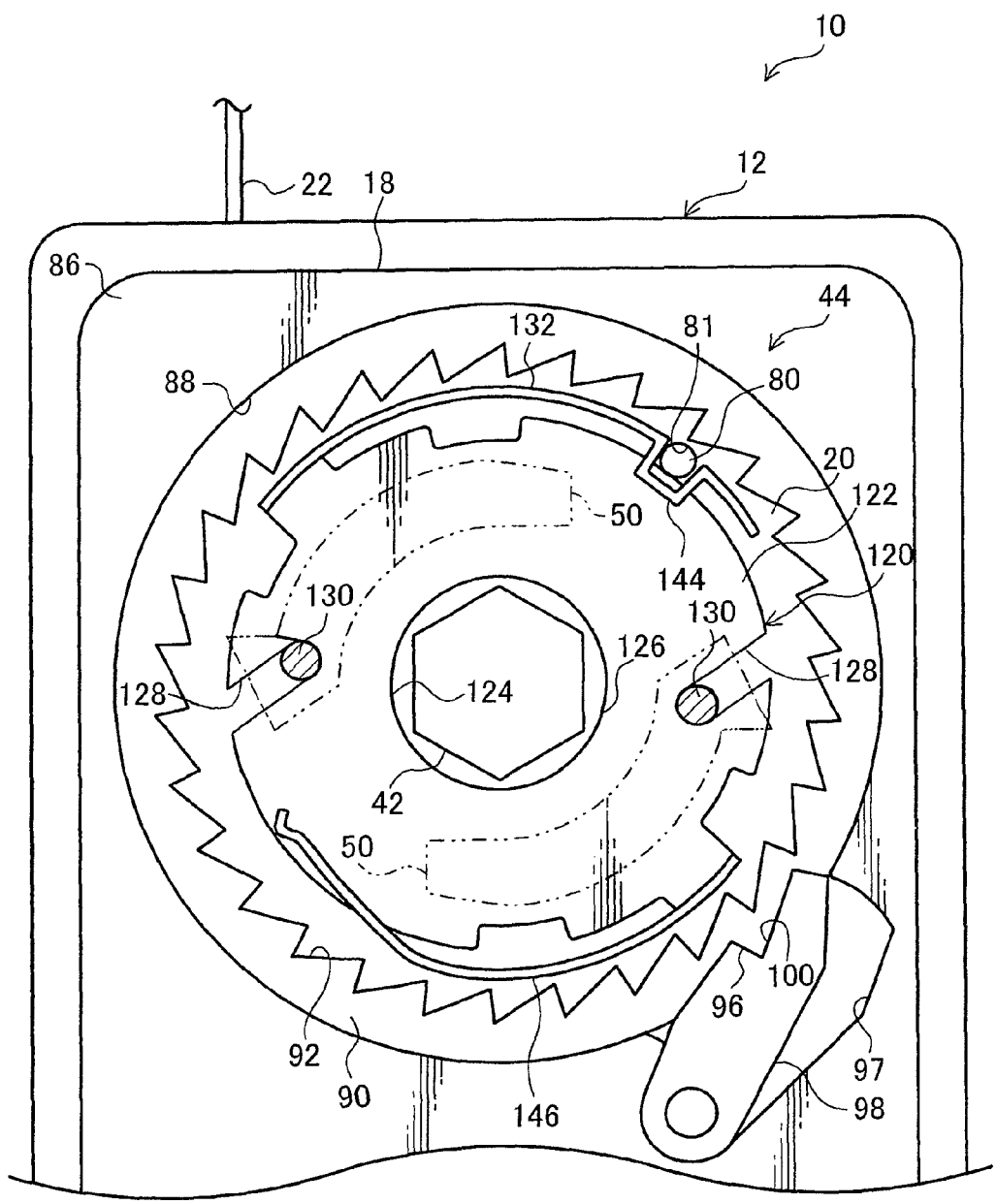
FIG. 2 is side view showing a configuration of a relative rotation inducing unit of a webbing winding device according to an exemplary embodiment of the present invention.

A guide plate 120 is provide to the above second lock base 46 on the spool 20 side. As shown in FIG. 2, the guide plate 120 is equipped with a plate portion 122 configuring a guide member and guide unit. The plate portion 122 is formed in a thin plate shaped with thickness direction along the axial direction of the spool 20. A circular hole 124 is formed in the plate portion 122. A support portion 126 formed between the second energy absorbing portion 40 and the second link portion 42 passes through the circular hole 124. The plate portion 122 is supported by the support portion 126 so as to be coaxial and relatively rotatable with respect to the spool 20.

A pair of guide holes 128 are formed as respective guide portions to the plate portion 122. Each of the guide holes 128 is an elongated hole with one end positioned at the outer peripheral side of the plate portion 122 relative to the other end, and a pin 130 formed to project out from the plate portion 122 side of each of the above second lock pawls 50 is inserted into each of the guide holes 128. When the second lock pawls 50 rotate along with the second lock base 46 in the pull-out direction relative to the plate portion 122, an inner peripheral portion of the each of the guide holes 128 interacts with the pin 130, moving the pin 130 towards the other length direction end side of the guide hole 128, and moving the second lock pawls 50 towards the open side of the pawl housing portions 48 at external peripheral portions of the second lock base 46.

A spring tab 132, serving as a relative rotation inducing portion and relative rotation inducing unit, extends from an external peripheral portion of the plate portion 122. The spring tab 132 is narrow in width, and is a plate spring of similar thin plate to the plate portion 122, with a base end portion as a portion coupled to the plate portion 122 along the axial direction of the spool 20, and the spring tab 132 curving towards the second lock base 46 side. The leading end side of the curved spring tab 132 has a thickness direction along the spool 20 radial direction, and extends out in the pull-out direction along an external peripheral portion of the second lock base 46 at the outside of the external peripheral portion of the second lock base 46.

A wire 80 is provided as a trigger unit to the spool 20, aligned with the leading end side of the spring tab 132. The wire 80 is housed in a guide hole 81 formed in the spool 20. The guide hole 81 is formed further to the radial direction outside of the spool 20 than the hollow portion in the spool 20 where the torsion shaft 24 is housed. The guide hole 81 is formed parallel to the central axial line of the spool 20 and is open to the two axial direction ends of the spool 20.

Most of the wire 80 is housed in the guide hole 81, with the length direction base end side of the wire 80 projecting out from the opening of the guide hole 81 at the leg plate 16 side. A wire guide groove 82 is formed to at least one of an end portions of the spool 20 on the first lock base 34 side and/or an end portion of the first lock base 34 on the spool 20 side (at an end portion of the spool 20 in the present exemplary embodiment), which corresponds to the base end of the wire 80.

The wire guide groove 82 curves around with a center of curvature at the central axial line of the spool 20, and a portion further to one end than the intermediate portion of the wire 80 is inserted inside the wire guide groove 82, and curves around to follow the curving of the wire guide groove 82. A portion at this end of the wire 80 is also bent around towards the first lock base 34 side inside of the wire guide groove 82 and is retained in the first lock base 34.

The leading end side of the wire 80 projects out from an opening at the leg plate 18 side of the guide hole 81. As shown in FIG. 1, for refuge of the leading end a cutout portion 142 is formed in the second lock base 46 so as give an opening in the external peripheral portion of the second lock base 46 aligned with the leading end side of the wire 80. The leading end side of the wire 80 is inserted into the inside of the cutout portion 142. The leading end side of the spring tab 132 is inserted against its own resiliency into the inside of the cutout portion 142. An engaged portion 144 is formed at the leading end side of the spring tab 132, bent around so as to be open facing in the opening direction of the cutout portion 142.

The leading end side of the wire 80 introduced into the cutout portion 142 is inserted inside the engaged portion 144, restricting the spring tab 132 from springing back due to its inherent resilience towards the opening direction side of the cutout portion 142. When the spool 20 rotates in this state in the winding direction or the pull-out direction, the leading end side of the wire 80 presses the engaged portion 144, and the spring tab 132, and therefore the guide plate 120, perform rotation following the spool 20.

A spring tab 146 is provided at the opposite side of the above circular hole 124 to the spring tab 132, with the circular hole 124 disposed between the spring tab 132 and the spring tab 146. The spring tab 146 extends from the plate portion 122 similarly to the spring tab 132, however there is no engaged portion 144 formed at the leading end side of the spring tab 146. The leading end side of the spring tab 146 extends out in the pull-out direction from the base end side which is a portion coupled to the plate portion 122. A retaining hole 148 is formed to the second lock base 46 aligned with the leading end side of the spring tab 146. The retaining hole 148 opens to an external peripheral portion of the second lock base 46, and the leading end side of the spring tab 146 is in an inserted state inside the retaining hole 148 against its inherent resilience, and makes press contact with an inner peripheral portion of the retaining hole 148.

The plate portion 122 is biased in the winding direction due to reaction force received by the spring tab 146 from the inner peripheral portion of the retaining hole 148 due to press contact of the spring tab 146 on the inner peripheral portion of the retaining hole 148, and due to reaction force received by the engaged portion 144, namely by the spring tab 132, from the wire 80 due to the wire 80 making press contact with the engaged portion 144. Accordingly, the pins 130 are biased to one length direction end side of the guide holes 128, and the second lock pawls 50 are retained so as not to unintentionally displace to the outside of the pawl housing portions 48.

As shown in FIG. 6, a generator base 86 is integrally coupled to the leg plate 18 on the outside of the leg plate 18. A circular hole 88 is formed in the generator base 86 coaxial to the spool 20. The inside diameter dimension of the circular hole 88 is sufficiently larger than the second lock base 46 for the second lock base 46 to pass through the circular hole 88. A lock ring 90 is axially supported in the circular hole 88 so as to be capable of rotation therein. As shown in FIG. 1, the lock ring 90 is formed overall in a ring shape. An inside ratchet 92 is formed to an inner peripheral portion of the lock ring 90.

The second lock base 46 and the spring tabs 132, 146 are disposed inside the inside ratchet 92. Ratchet teeth of the inside ratchet 92 are formed so as to correspond to ratchet teeth formed to the leading end side of the second lock pawls 50. The second lock pawls 50 mesh with the inside ratchet 92 when the leading end side of the second lock pawls 50 project outside the pawl housing portions 48. In a state in which interaction of the wire 80 with the engaged portion 144 of the spring tab 132 is released, the spring tab 132 attempts to spring back due to its inherent resilience, and when the leading end of the spring tab 132 displaces towards the second lock base 46 radial direction outside, the leading end of the spring tab 132 faces the ratchet teeth of the inside ratchet 92 at the winding direction side of the inside ratchet 92.

Furthermore, the leading end of the spring tab 132 restricts rotation of the guide plate 120 in the pull-out direction by interaction with the ratchet teeth of the inside ratchet 92. The dimensions of the spring tab 132 and the shape (length and the like) of the guide hole 128 are set such that when the second lock base 46 has rotated from this state in the pull-out direction relative to the guide plate 120, the second lock pawls 50 make contact with the ratchet teeth of the inside ratchet 92, without the second lock pawls 50 moving past the tips of the ratchet teeth on the inside ratchet 92.

An outside ratchet 96 is formed to a portion on the outer periphery of the lock ring 90. A ring-lock pawl housing hole 97 is formed in the generator base 86 to correspond to the outside ratchet 96. The ring-lock pawl housing hole 97 is in communication with the circular hole 88. A ring lock pawl 98 is provided inside the ring-lock pawl housing hole 97. A ring lock ratchet 100 is formed at the leading end side of the ring lock pawl 98 so as to be capable of meshing with the outside ratchet 96.

In a state in which the ring lock ratchet 100 has meshed with the outside ratchet 96, when the lock ring 90 attempts to rotate in one direction about its own axis, the ring lock pawl 98 attempts to perform rotation following the lock ring 90. However, when the ring lock pawl 98 attempts to rotate in one direction about the axis of the lock ring 90 accompanying the lock ring 90, the internal wall of the ring-lock pawl housing hole 97 interacts with the ring lock pawl 98, restricting rotation of the ring lock pawl 98, and therefore restricting rotation of the lock ring 90.

A gas generator 114 configuring a lock release unit is provided to the generator base 86 below the ring lock pawl 98. The gas generator 114 is disposed inside a generator housing hole 116 formed in the generator base 86, and the gas generator 114 is fixed to the generator base 86 by fasteners, not shown in the drawings, such as, for example, bolts or the like. Chemical agents, such as, for example, an ignition agent, a gas generating agent and the like, and an ignition device is housed inside the gas generator 114, for igniting the ignition agent by input of an electrical ignition signal. The ignition device of the gas generator 114 is connected to an ECU (control device), not shown in the drawings.

The ECU is, for example, directly or indirectly connected to both danger notification means and build detection means. Through, for example, an acceleration sensor for detecting a rapid deceleration state of the vehicle, a distance measurement sensor for detecting when the distance in front of the vehicle to an obstruction has become less than a specific value, and the like, the danger notification means directly or indirectly detects that the vehicle has rapidly decelerated or that a rapid deceleration state is likely to occur. Through, for example, a weight sensor for detecting the load acting on the vehicle seat, a belt sensor for detecting the whether a specific amount or more of the webbing belt 22 has been pulled out from the spool 20, and the like, the build detection means directly or indirectly detects the build of an occupant seated in a seat.

An ignition signal is output from the ECU to the ignition device of the gas generator 114 when the ECU, based on a signal from the danger notification means, has determined that a rapid deceleration state of the vehicle has arisen or that a rapid deceleration state of the vehicle is likely to arise, and has determined that the build of the occupant seated in the seat is less than a predetermined reference value. Gas is instantly generated inside the gas generator 114 by the ignition agent igniting due to an ignition signal input to the ignition device of the gas generator 114, and the ignition agent further causing combustion of the gas generating agent. The pressure of this gas actuates a specific member, not shown in the drawings, so as to release meshing of the ring lock ratchet 100 of the ring lock pawl 98 and the outside ratchet 96 of the lock ring 90.

<Operation and Effect of the Present Exemplary Embodiment>

Explanation now follows regarding operation and effect of the present exemplary embodiment.

(Operation of the First Lock Mechanism 32)

In the webbing winding device 10, in a state in which the webbing belt 22 has been pulled out from the spool 20 and fitted around the body of an occupant of the vehicle, first, when the first lock mechanism 32 is actuated, such as, for example, when a vehicle rapid deceleration state arises, rotation of the rotation member 38 in the pull-out direction is restricted. Next, when the body of the occupant attempts to move forward due to inertia during rapid deceleration of the vehicle, the webbing belt 22 is pulled violently and attempts to rotate the spool 20 in the pull-out direction, the first lock base 34 that is integrally coupled to the spool 20 through the torsion shaft 24 rotates in the pull-out direction. In this state, since rotation of the rotation member 38 in the pull-out direction is restricted as described above, relative rotation occurs between the first lock base 34 and the rotation member 38, and the first lock pawl 36 approaches the first lock base 34.

The ratchet teeth of the first lock pawl 36 thereby mesh with the ratchet teeth of the first lock base 34, restricting rotation of the first lock base 34 in the pull-out direction, and therefore restricting rotation of the spool 20 in the pull-out direction. The webbing belt 22 is accordingly restricted from being pulled out from the spool 20. Consequently, the body of the occupant, which is attempting to move forward, can be reliably restrained by the webbing belt 22.

(Operation of the Torsion Shaft 24)

As above, in the state in which rotation of the first lock base 34 is restricted by the first lock pawl 36, when the webbing belt 22 is pulled by the body of the occupant with an even greater force, and the rotation force on the spool 20 resulting from this pull-out force exceeds the mechanical strength of the first energy absorbing portion 28, the first energy absorbing portion 28 twists while the first link portion 30 remains in a coupled state to the first lock base 34, and the spool 20 rotates in the pull-out direction by the amount of this twisting. Accordingly, the webbing belt 22 is pulled out from the spool 20 by the rotation amount in the pull-out direction of the spool 20. The restraining force on the occupant due to the webbing belt 22 is thereby slightly weakened, and energy is absorbed as the webbing belt 22 is pulled out by the twisting deformation amount described above.

(Operation of the Wire 80)

Rotation of the spool 20 relative to the first lock base 34 in the pull-out direction, as described above, means that, relatively, the first lock base 34 rotates in the winding direction with respect to the spool 20. When the first lock base 34 rotates accordingly in the winding direction with respect to the spool 20, the wire 80 is pulled while being guided in the wire guide groove 82 of the first lock base 34 while the portion at one end of the wire 80 remains in a retained state in the first lock base 34. The end of the wire 80 further towards the leg plate 16 side than the length direction intermediate portion is thereby pulled in from the opening of the guide hole 81, and becomes accommodated in the wire guide groove 82.

(Operation of the Second Lock Mechanism 44)

Figure 3:
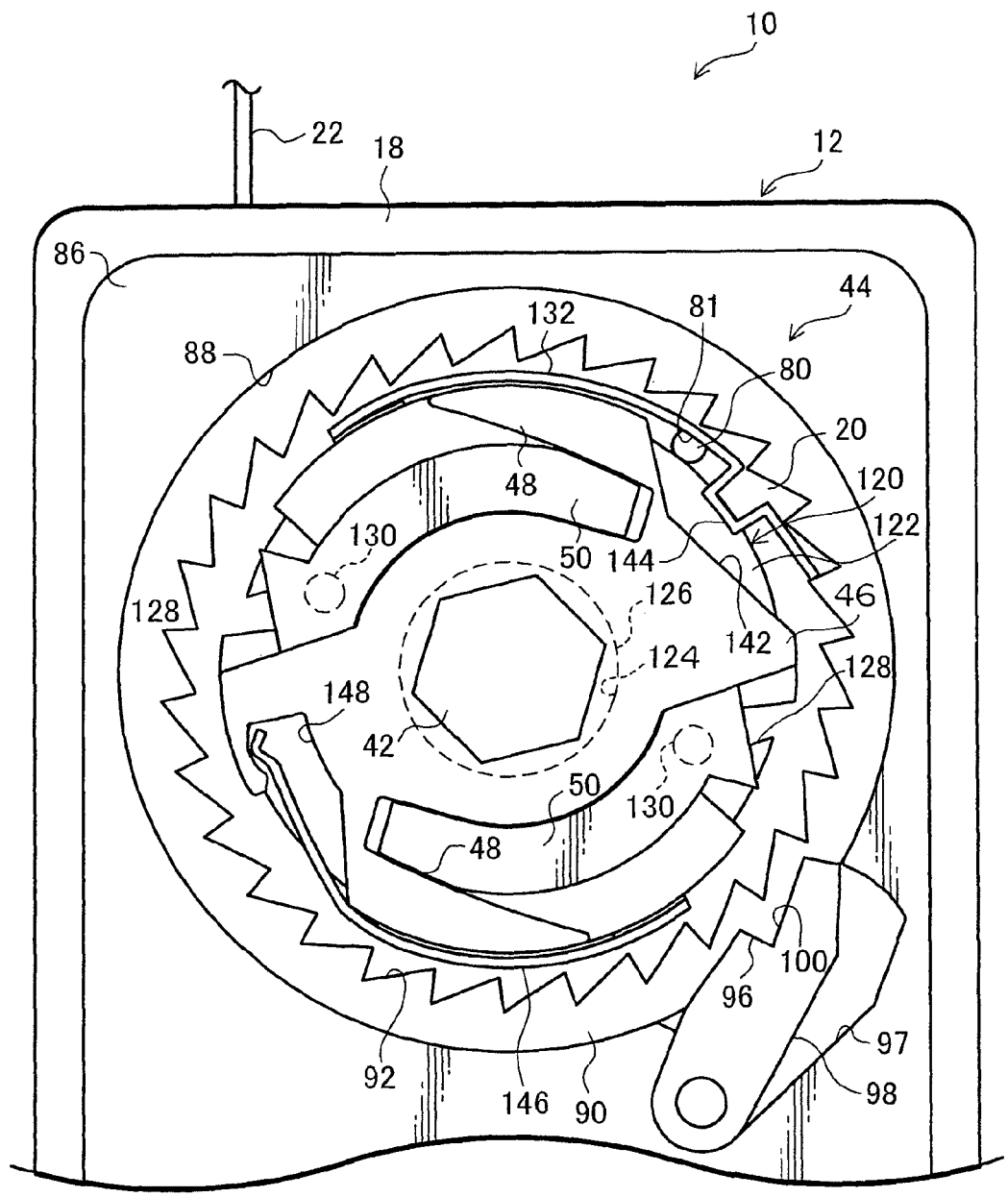
FIG. 3 is a side view corresponding to FIG. 1 and showing a state in which rotation of a guide unit is restricted.

When the end of the wire 80 is pulled out from the guide hole 81 by relative rotation of the first lock base 34 with respect to the spool 20, as described above, the portion at the other end of the wire 80 is pulled into the guide hole 81. The interaction of the wire 80 with the engaged portion 144 is released by the portion at the other end of the wire 80 being pulled into the guide hole 81, thereby displacing the leading end side of spring tab 132 under its inherent resilience towards the open side of the cutout portion 142. Accordingly, as shown in FIG. 3, a portion at the leading end of the spring tab 132 makes contact with the ratchet teeth of the inside ratchet 92, facing the ratchet teeth from the winding direction side.

Rotation of the guide plate 120 in the pull-out direction is restricted when the leading edge portion of the spring tab 132 makes contact with the ratchet teeth of the inside ratchet 92. In this state, when the second lock base 46, which is not relative rotatable with respect to the spool 20, rotates through the torsion shaft 24 in the pull-out direction together with the spool 20, the second lock base 46 relatively rotates in the pull-out direction with respect to the guide plate 120.

Figure 4:
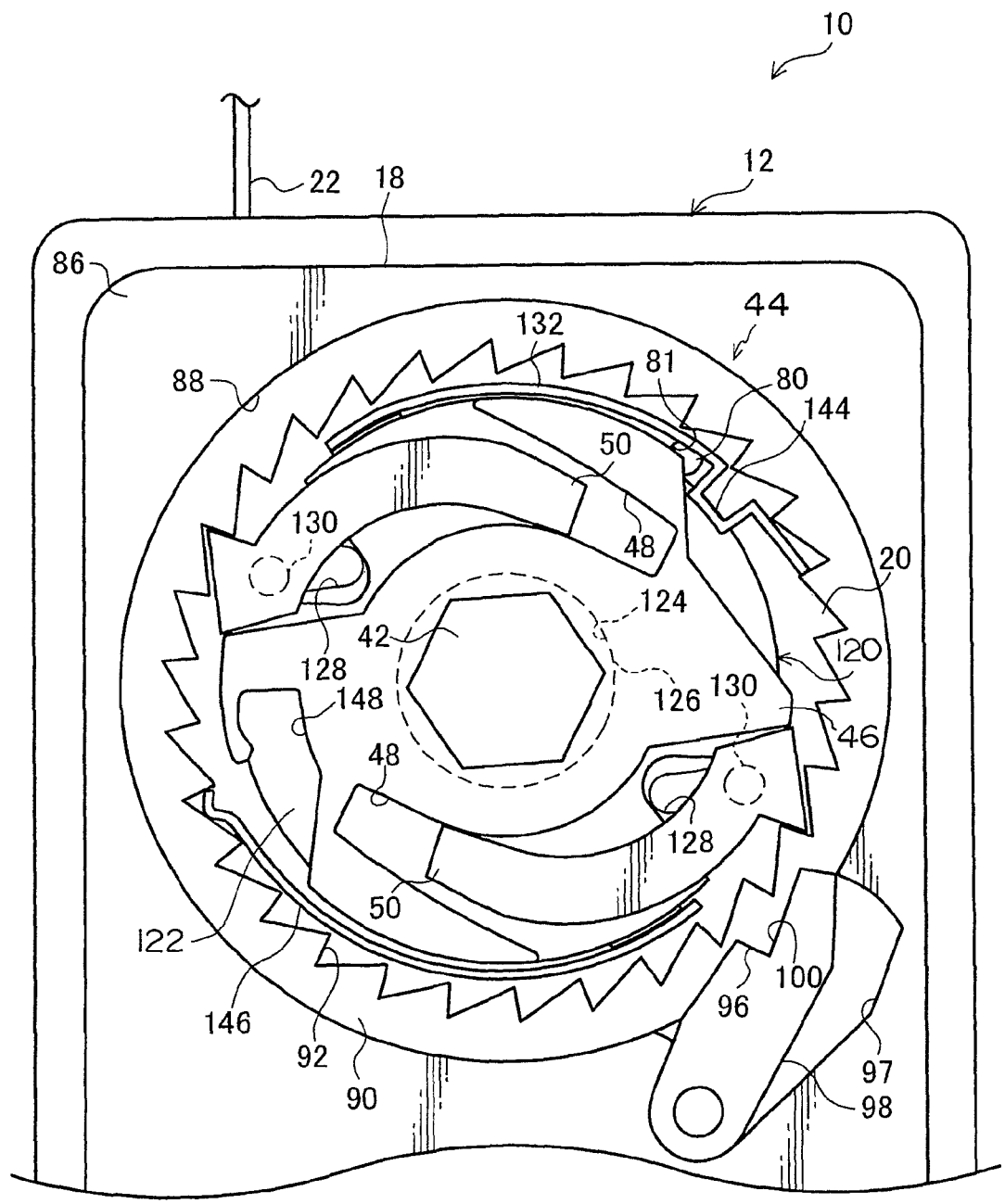
FIG. 4 is a side view corresponding to FIG. 1 and showing a state in which a base member has rotated in a pull-out direction with respect to a guide unit.

Accordingly, inner peripheral portions of the guide holes 128 of the plate portion 122 of the guide plate 120 interact with the pins 130 formed to the second lock pawls 50, moving the pins 130 to the other side in the length direction of the guide holes 128. The length of the spring tab 132 of the guide plate 120 and the shape (length and the like) of the guide holes 128 of the plate portion 122 are set such that when relative rotation in the pull-out direction of the second lock base 46 with respect to the guide plate 120 occurs, the second lock pawls 50 make contact with the ratchet teeth of the inside ratchet 92 without moving past the tooth tips of the ratchet teeth of the inside ratchet 92. Accordingly, the leading end side of the second lock pawls 50 protruding out from the openings of the pawl housing portions 48 at external peripheral portions of the second lock base 46, as shown in FIG. 4, smoothly and reliably mesh with the ratchet teeth of the inside ratchet 92.

The spool 20 being pulled by the webbing belt 22 attempts to rotate in the pull-out direction. The second lock pawls 50 therefore attempt to rotate together with the second lock base 46 in the pull-out direction. Consequently, the second lock pawls 50 transmit rotation force in the pull-out direction of the second lock base 46 to the meshed lock ring 90, and the lock ring 90 attempts to rotate in the pull-out direction. In this state, if the ring lock ratchet 100 of the ring lock pawl 98 is meshed with the outside ratchet 96 of the lock ring 90, the ring lock pawl 98 interacts with inside wall of the ring-lock pawl housing hole 97, and rotation of the ring lock pawl 98, and therefore rotation of the lock ring 90, is restricted in the pull-out direction.

When rotation of the lock ring 90 in the pull-out direction is restricted, rotation of the second lock base 46 in the pull-out direction is also restricted. In this state, when the rotation force on the spool 20 in the pull-out direction, arising from tension force when the body of an occupant pulls the webbing belt 22, exceeds the total of the mechanical strength of the first energy absorbing portion 28 and the mechanical strength of the second energy absorbing portion 40, the second energy absorbing portion 40 twists along with twisting of the first energy absorbing portion 28, while the coupled state of the second link portion 42 to the second lock base 46 remains, and the spool 20 rotates in the pull-out direction by the amount of twisting.

Consequently, the webbing belt 22 is pulled out from the spool 20 by the rotation amount of the spool 20 in the pull-out direction. Accordingly, the restraining force from the webbing belt 22 on the occupant is slightly reduced, and energy is absorbed accompanying pulling out of the webbing belt 22 with the above described twisting deformation.

Figure 5:
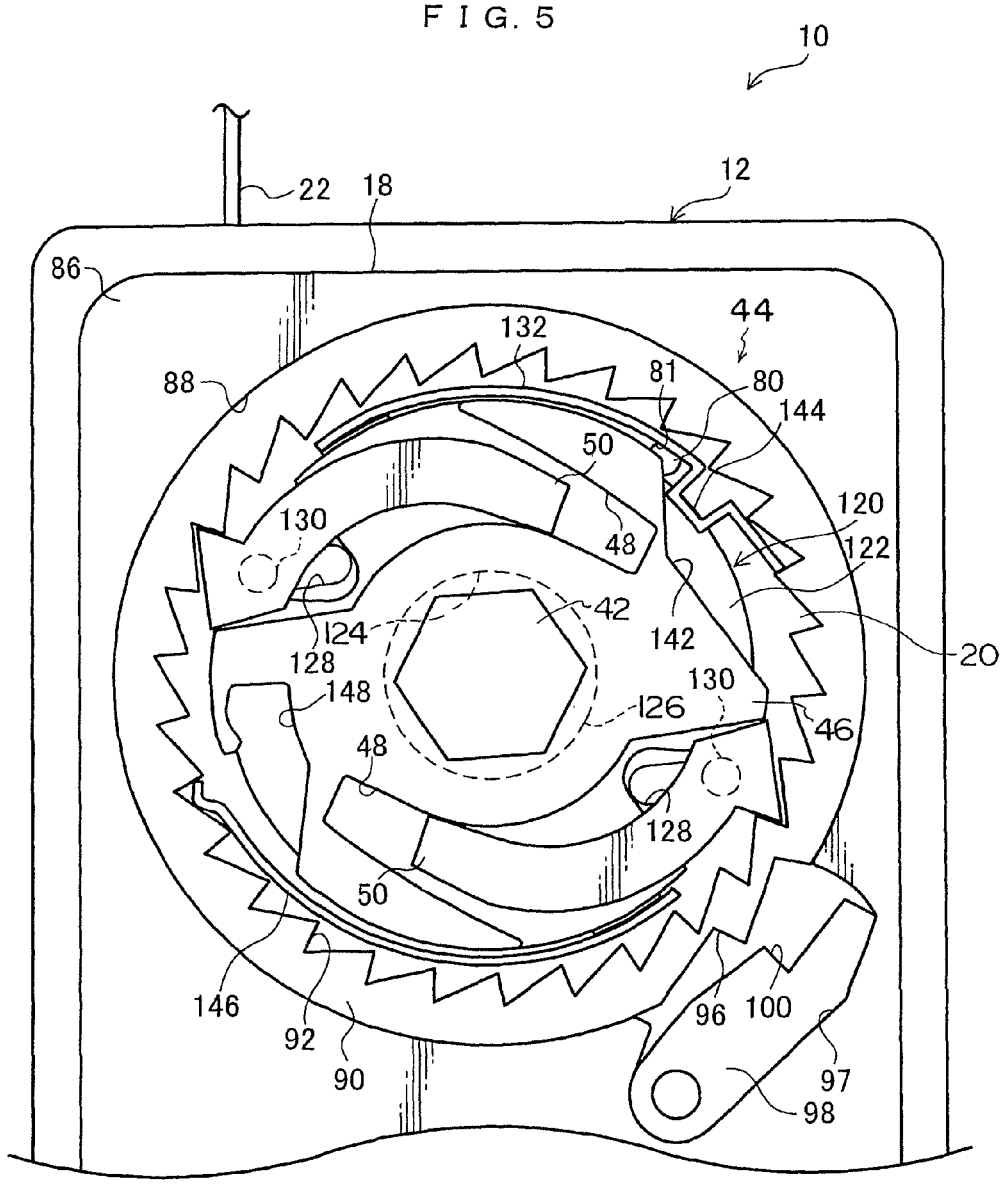
FIG. 5 is a side view corresponding to FIG. 1 and showing an operation released state of a second lock unit.

Prior to actuation of the first lock mechanism 32, the ignition signal is output by the ECU when that ECU has determined that the vehicle is in a state of rapid deceleration or a state just before rapid deceleration and the ECU has determined that the build of the occupant seated in the seat is less than a predetermined reference value based on the signal from the build detection means. The gas generator 114 is thus actuated and, as shown in FIG. 5, meshing of the ring lock ratchet 100 of the ring lock pawl 98 and the outside ratchet 96 of the lock ring 90 is released.

In this state, rotation force of the spool 20 in the pull-out direction is transmitted to the lock ring 90 through the second lock base 46 and the second lock pawls 50, the lock ring 90 rotates together with the spool 20 in the pull-out direction. Consequently, in this state, twisting occurs in the first energy absorbing portion 28. However, no twisting occurs in the second energy absorbing portion 40. Accordingly, energy absorption does not occur in this state due to twisting deformation of the second energy absorbing portion 40.

Namely, according to the present exemplary embodiment, by controlling the gas generator 114, selective switching can be made between a mode in which deformation of the second energy absorbing portion 40 occurs, and a mode in which deformation of the second energy absorbing portion 40 does not occur. Appropriate energy absorption can thereby be applied according to the build and the like of occupant wearing the webbing belt 22.

Operation and Effect of the Present Exemplary Embodiment from an Assembly Perspective In the present exemplary embodiment, the leading end of the spring tab 132 of the guide plate 120 interacts with the ratchet teeth of the inside ratchet 92, and when the second link portion 42 is further rotated from this state in the pull-out direction, relative rotation occurs between the guide plate 120 and the second lock base 46, thereby meshing the second lock pawls 50 with the ratchet teeth of the inside ratchet 92. Consequently, since the present exemplary embodiment is not a configuration in which relative rotation is caused to occur between the guide plate 120 and the second lock base 46 using bias force of biasing means, such as, for example, a coil spring or the like, bias force is not received in the rotation circumferential direction when the guide plate 120 and the second lock base 46 are being assembled, and assembly can be easily made.

Note that whereas the present exemplary embodiment is configured to absorb energy by twisting of the first energy absorbing portion 28 and the second energy absorbing portion 40, other embodiments may be configured. For example, there is no limitation to making the first energy absorbing portion 28 and the second energy absorbing portion 40 such that energy absorption is by plastic deformation twisting deformation, and configuration may be made with such deformation being compression deformation, wearing away, or the like.

What is claimed is:

1. A webbing winding device comprising:
a cylindrical shaped spool having a length direction base end side of a long strip-shaped webbing belt anchored to the spool, the webbing belt being wound from the base end side by rotation of the spool in a winding direction;
an energy absorbing unit comprising a first energy absorption section connected to the spool at an axial direction intermediate portion inside the spool, such that a spool-side coupling portion is not rotatable relative to the spool, the first energy absorption section absorbing energy on a side further towards a first axial direction end of the spool than the spool-side coupling portion deforming plastically with respect to the spool-side coupling portion, and a second energy absorption section absorbing energy on a side further towards a second axial direction end of the spool than the spool-side coupling portion deforming plastically with respect to the spool-side coupling portion;
a first lock unit provided at the first axial direction end of the spool, when actuated the first lock unit retaining the first energy absorption section at the opposite side to the spool-side coupling portion and restricting rotation of the first energy absorption section in a pull-out direction that is opposite to the winding direction; and
a second lock unit provided at the second axial direction end of the spool, when actuated the second lock unit retaining the second energy absorption section at the opposite side to the spool-side coupling portion and restricting rotation of the second energy absorption section in the pull-out direction that is opposite to the winding direction, the second lock unit comprising:
a base member connected at the second axial direction end of the spool to the second energy absorption section so as not to be relatively rotatable with respect to the second energy absorption section;
a lock member relatively displaceable towards an engagement direction that is outward in a rotation radial direction of the spool with respect to the base member;
a restriction unit provided at the rotation radial direction outside of the base member, the restriction unit comprising internal ratchet teeth engageable by the lock member when displaced in the engagement direction, and restricting rotation of the base member in the pull-out direction by the lock member engaging the ratchet teeth;
a guide member retaining the lock member in a state separated from the ratchet teeth, and guiding the lock member towards the engagement direction while the base member rotates relative to the guide member in the pull-out direction; and
a relative rotation inducing member engaged directly or indirectly with the spool, the relative rotation inducing member causing the guide member to rotate with the spool when in the engaged state, and restricting rotation of the guide member in the pull-out direction by engaging the ratchet teeth of the restriction unit, and inducing relative rotation of the base member with respect to the guide member when engagement of the relative rotation inducing member to the spool is released by actuation of the first lock unit.

2. The webbing winding device of claim 1, wherein:
the guide member is provided to the second energy absorption section at a side of the spool so as to be relatively rotatable with respect to the second energy absorption section, and includes a guide portion that engages the lock member, the guide portion guiding the lock member towards the engagement direction by the lock member relatively rotating in the pull-out direction;
the relative rotation inducing member is provided to the guide member, a leading end side of the relative rotation inducing member experiencing a biasing force toward the restriction unit in a direction to engage with the ratchet teeth, and the relative rotation inducing member restricting rotation of the guide member in the pull-out direction by the leading end side of the relative rotation inducing member engaging with the ratchet teeth; and
the webbing winding device further comprising a trigger unit provided to the spool, that retains the relative rotation inducing member against the biasing force such that the relative rotation inducing member stays in a position separated from the ratchet teeth, and releases retention of the relative rotation inducing member to actuate the second lock unit by actuating the first lock unit.

3. The webbing winding device of claim 2, wherein:

the guide member is configured by a plate portion formed in a thin plate shape having a thickness direction along the spool axial direction, supported at the side of the base member so as to be rotatable relative to the second energy absorption section and formed with the guide portion; and the relative rotation inducing member is configured by a spring tab extending from the plate portion and connected to an external peripheral portion of the plate portion, the leading end side of the spring tab being retained by the trigger unit, and the spring tab engaging with the ratchet teeth due to an inherent resilience of the spring tab when retention by the trigger unit is released.

* * * * *